US006789839B1

(12) United States Patent
Samuelson

(10) Patent No.: US 6,789,839 B1
(45) Date of Patent: Sep. 14, 2004

(54) WIND DAM FOR USE WITH TRACTOR-TRAILERS

(75) Inventor: Alan Samuelson, 2008 West St., Ames, IA (US) 50014

(73) Assignee: Alan Samuelson, Laurens, IA (US)

( * ) Notice: Subject to any disclaimer, the term of this patent is extended or adjusted under 35 U.S.C. 154(b) by 0 days.

(21) Appl. No.: 10/386,363

(22) Filed: Mar. 11, 2003

(51) Int. Cl.⁷ .............................................. B62D 35/00
(52) U.S. Cl. ................................................... 296/180.4
(58) Field of Search ........................... 296/180.4, 180.2

(56) References Cited

U.S. PATENT DOCUMENTS

| | | | |
|---|---|---|---|
| 2,737,411 A | 3/1956 | Potter | |
| 4,142,755 A | 3/1979 | Keedy | |
| 4,236,745 A | 12/1980 | Davis | |
| 4,257,641 A | 3/1981 | Keedy | |
| 4,601,508 A | * 7/1986 | Kerian | ..................... 296/180.4 |
| 4,702,509 A | * 10/1987 | Elliott, Sr | ................ 296/180.4 |
| 4,818,015 A | 4/1989 | Scanlon | |
| 4,978,162 A | 12/1990 | Labbe | |
| 5,058,945 A | 10/1991 | Elliott, Sr. et al. | |
| 5,236,347 A | 8/1993 | Andrus | |
| 5,375,903 A | 12/1994 | Lechner | |
| 5,823,610 A | 10/1998 | Ryan et al. | |
| 6,257,654 B1 | * 7/2001 | Boivin et al. | ............ 296/180.4 |
| 6,309,010 B1 | 10/2001 | Whitten | |

FOREIGN PATENT DOCUMENTS

GB          2148207 A     *  5/1985

* cited by examiner

Primary Examiner—Jason Morrow
(74) Attorney, Agent, or Firm—Daniel A. Rosenberg; Kent A. Herink; Davis, Brown, Koehn, Shors & Roberts, P.C.

(57) ABSTRACT

The invention comprises an inflatable cone-shaped wind dam for reducing the air drag of a moving tractor-trailer. The wind dam is comprised of two longitudinally opposed sections each section having an outer shell and an inner inflatable bladder, constructed so that the outer shell houses the inner inflatable bladder. The cone-shaped wind dam further comprises an inflatable mating joint for maintaining the form and structure of the wind dam.

12 Claims, 21 Drawing Sheets

WIND DAM FOR USE WITH TRACTOR-TRAILERS

BACKGROUND OF THE INVENTION

1. Field of the Invention

The present invention relates generally to a wind dam device used to reduce the air drag of tractor-trailers. In particular, the invention relates to an inflatable wind dam for reducing the air drag of a moving tractor-trailer located on the back or leeward side of the trailer. The wind dam is cone-shaped and comprised of two longitudinally opposed sections, each section having an outer shell and an inner inflatable bladder contained therein. The wind dam has an inflatable mating joint for maintaining the form and structure of the opposed sections of the cone-shaped wind dam.

2. Background

Various devices are currently known to increase the aerodynamic efficiency of a truck, semi trailer, or other large moving object. It has long been recognized that the rectangular high profile shape of these vehicles and the speeds necessary for travel increase the amount of air drag, which can account for about half of the fuel consumption in trucking. While the remaining fuel waste is due to the amount of weight carried in the vehicle as well as the engine efficiency, reducing the effects of air drag has the greatest potential to reduce overall fuel consumption and is one of the easier factors to manipulate.

The devices currently known to increase aerodynamic efficiency, while somewhat effective, suffer from a number of drawbacks. The previous devices have been attached to the back of trucks often include loose pieces that must be attached and removed to accommodate loading and unloading. As a result, the pieces are easy to lose, and are time consuming to assemble because they are heavy and bulky making them difficult to both attach and remove. Similarly, other devices do not allow for the convenient loading and unloading of the trailer's cargo because they consist of a single attached unit that must be removed in order to open and close the trailer doors. Furthermore, often the prior art devices are ineffective in that they provide little drag reduction when in use or are costly to produce and install.

For these reasons inflatable drag resistors have become preferred because they are light, inexpensive, and may be collapsed without the use of an excessive number of moving parts, examples of such devices are disclosed in U.S. Pat. No. 4,978,162 (Labbe), U.S. Pat No. 5,236,347 (Andrus), U.S. Pat. No. 5,375,903 (Lechner) and U.S. Pat. No. 5,832,610 (Ryan et al.). However, despite the preference of inflatable wind dams, not many are in use because they still tend to fail in solving the problems currently associated with wind dams, for instance, there is the continued difficultly created when loading and unloading the tractor-trailer because the wind dam is attached as one unit to the back. (See Lechner, Andrus). Similarly, Ryan et al. uses a single attached unit in which the unit is rolled in and out of a container for storage. Thus Ryan et al. teaches a complicated system again utilizing numerous moving parts, which is difficult to use and maintain.

To allow for easy loading and unloading of the tractor-trailer it is necessary to develop a system formed of two halves that combine to form a whole unit when inflated. Thus, providing for air drag reduction while still permitting easy loading and unloading of the trailer. Labbe discloses a system that solves this problem by separating the unit, creating two halves to function together as a single wind dam. However, Labbe's system fails to connect the adjacent halves in a way that prevents them from interfering with each other during operation. Furthermore, Labbe's wind dam inflates through the movement of the truck instead of through the use of a control device and is not protected when un-inflated, both of which create a situation that leaves the wind dam vulnerable to damage.

Accordingly a need exists for an improved wind dam device for effectively reducing the air drag of a tractor-trailer.

SUMMARY OF THE INVENTION

An object of the present invention is to provide a wind dam device for effectively reducing the air drag of a tractor-trailer.

The present invention intends to overcome the difficulties encountered heretofore. To that end, the invention comprises an inflatable cone-shaped wind dam for reducing the air drag of a moving tractor-trailer. The wind dam is comprised of two longitudinally opposed sections each section having an outer shell and an inner inflatable bladder, constructed so that the outer shell houses the inner inflatable bladder. The cone-shaped wind dam further comprises an inflatable mating joint for maintaining the form and structure of the wind dam.

DETAILED DESCRIPTION OF THE INVENTION

The purpose of this invention is to reduce drag on a moving object through the atmosphere, thus increasing efficiency. This is accomplished by attaching a drag cone to the leeward end of an object, thus delaying the flow separation to a point further down stream with less intensity. Due to the resulting decrease in drag having a great effect on larger bodies (i.e. tractor-trailers or semi-trailers) the drag cone's primary use may be on tractor-trailers, but the invention is not limited to this area.

Figure 2:
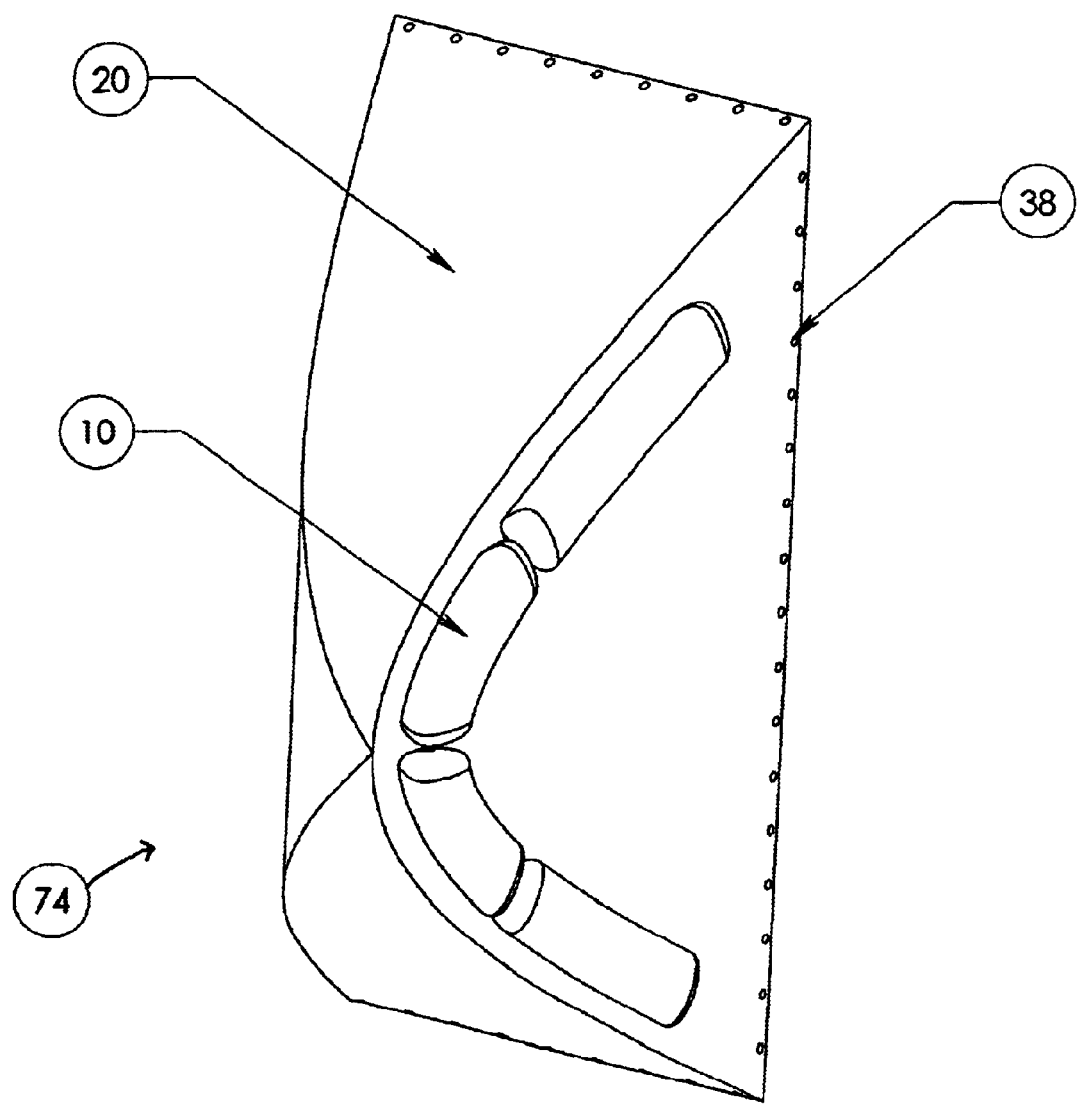
FIG. 2 is a side view of the male outer shell.
Figure 3:
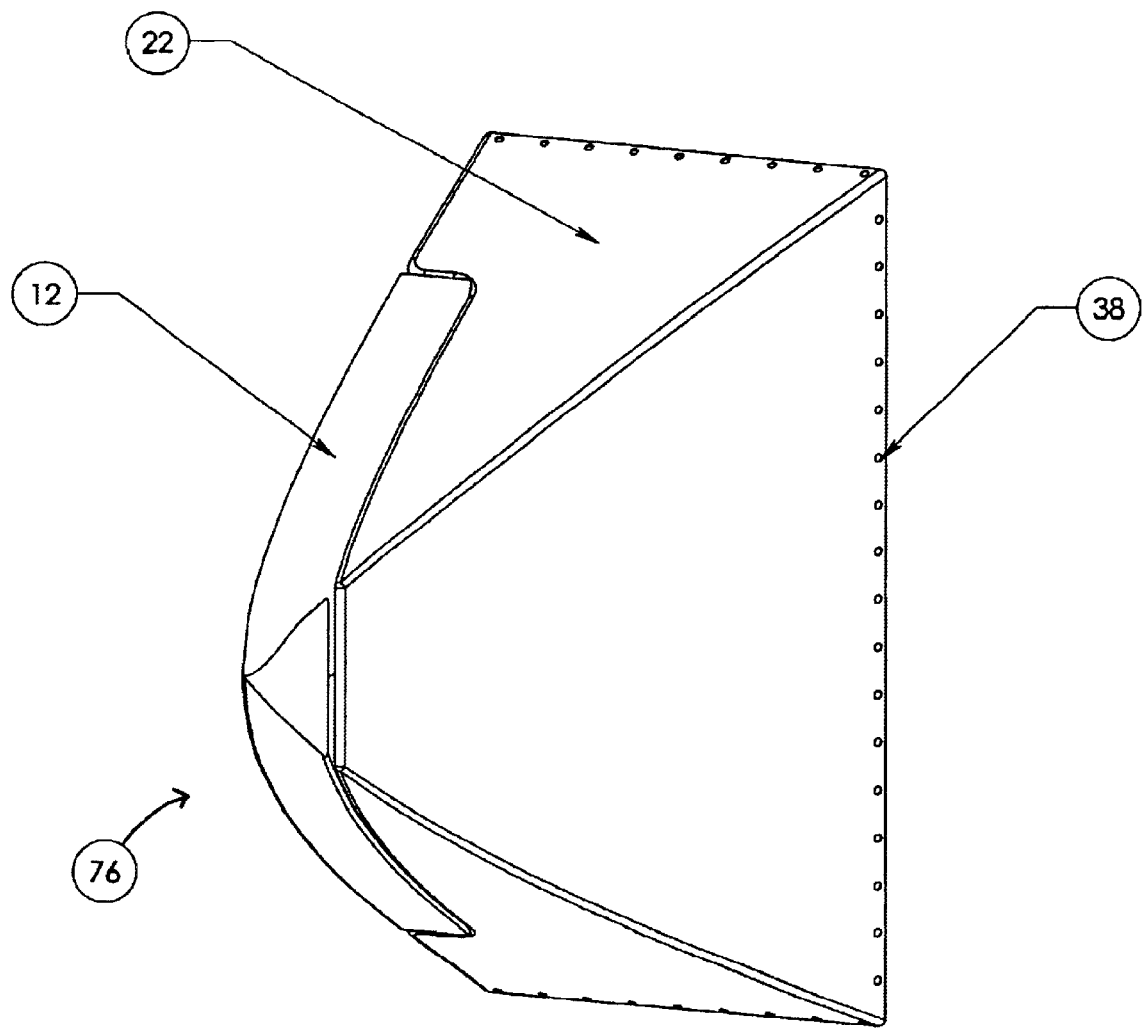
FIG. 3 is a perspective view of a female outer shell of the wind dam.
Figure 4:
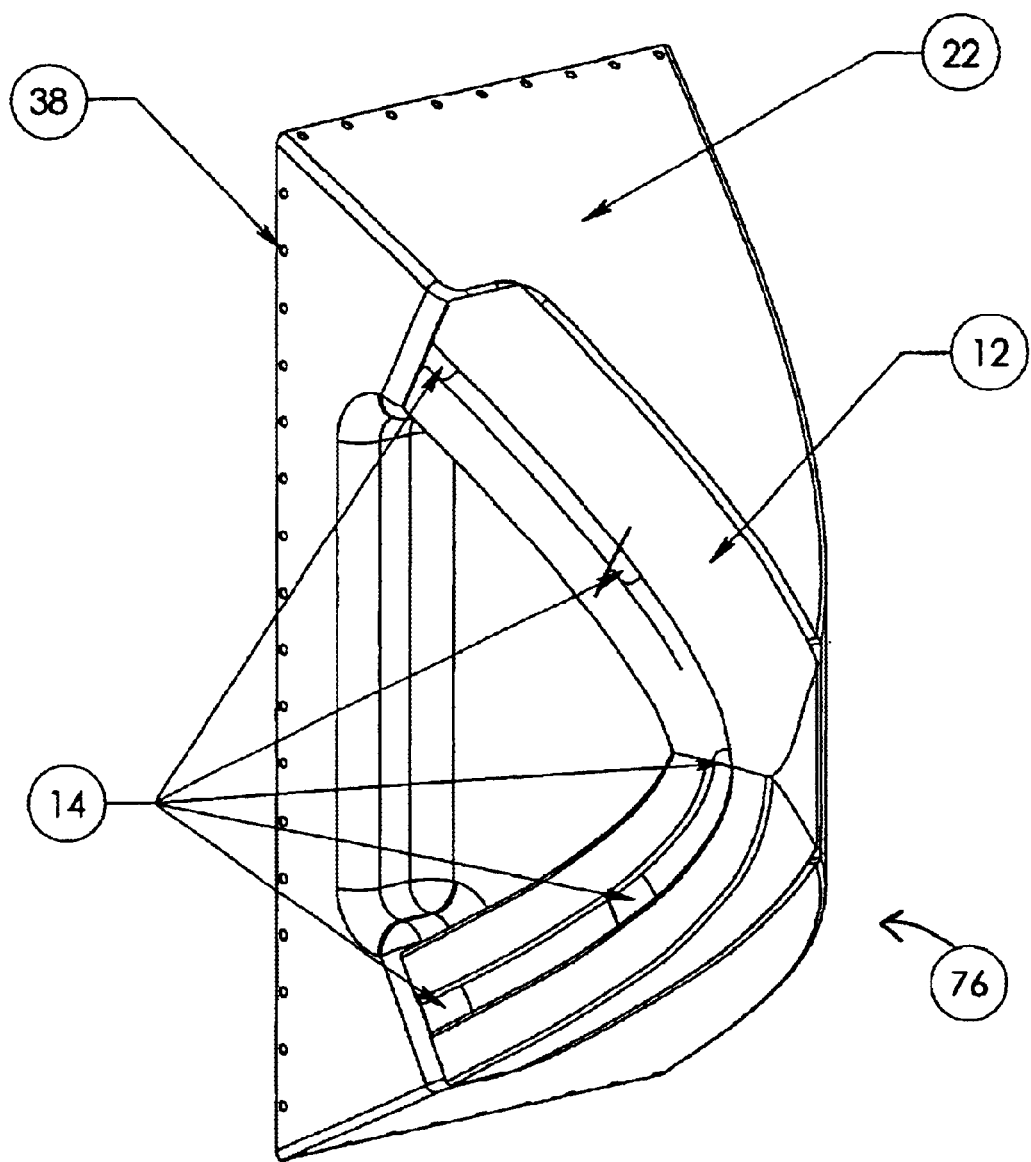
FIG. 4 is a side view of the female outer shell showing a female mating joint.

In the Figures, is shown a wind dam 1 used in reducing the air drag behind fast moving semis or other tractor-trailers 2. In order to easily facilitate the loading and unloading of trailers the wind dam 1 is designed as two halves, a male half 74 (see FIGS. 1–2) and female half 76 (see FIGS. 3–4), which when connected by mating joints 10, 12 and inflated, form the single cone shaped wind dam 1. The two halves 74, 76 each have a corresponding outer shell 20, 22 (see FIGS. 1–4) and a corresponding inner bladder 24, 26 (see FIGS. 5–6) which are attached to a trailer door 28 (see FIG. 7) of the trailer (not shown). The operator may inflate and deflate the wind dam 1 with an air supply control system (shown schematically in FIG. 18), which is located in a tractor cab (not shown). The operational controls of the wind dam 1 are located in the cab.

Outer Shell

The outer shells 20, 22 are constructed of a relatively thin, light, and flexible material that is non-elastic in structure and resistant to tears, punctures, and abrasion. The outer shells 20, 22 have an elastic material (not shown) attached to the inside of the non-elastic material in order to provide a shrinking effect as the dam deflates. The purpose for shrinking the dam upon deflation is to ensure that it does not sag or inhibit the operator from access when loading or unloading the tractor-trailer. Hook and loop fastener or similar material is strategically placed on the inside of the outer shells 20, 22 and corresponding locations along the perimeter of the inner bladders 24, 26 to secure the outer shells 20, 22 to the inner bladders 24, 26 respectively. In this way, the hook and loop fastener aids the inner bladders 24, 26 in maintaining contact to the outer shells 20, 22 in the position in which they are attached to a tractor-trailer door 28. Hook and loop fastener 60 is used to secure the inner bladders 24, 26 and the outer shells 20, 22, which meet and are affixed to each other in a manner that provides for proper alignment of the inner bladders 24, 26 inside the outer shells 20, 22 during inflation and deflation as well as make the outer shells 20, 22 responsive to the deflation of the inner bladders 24, 26. More importantly, the use of hook and loop fastener between these areas will guarantee correct alignment of mating joints 10, 12 during inflation.

Inner Bladder

Figure 5:
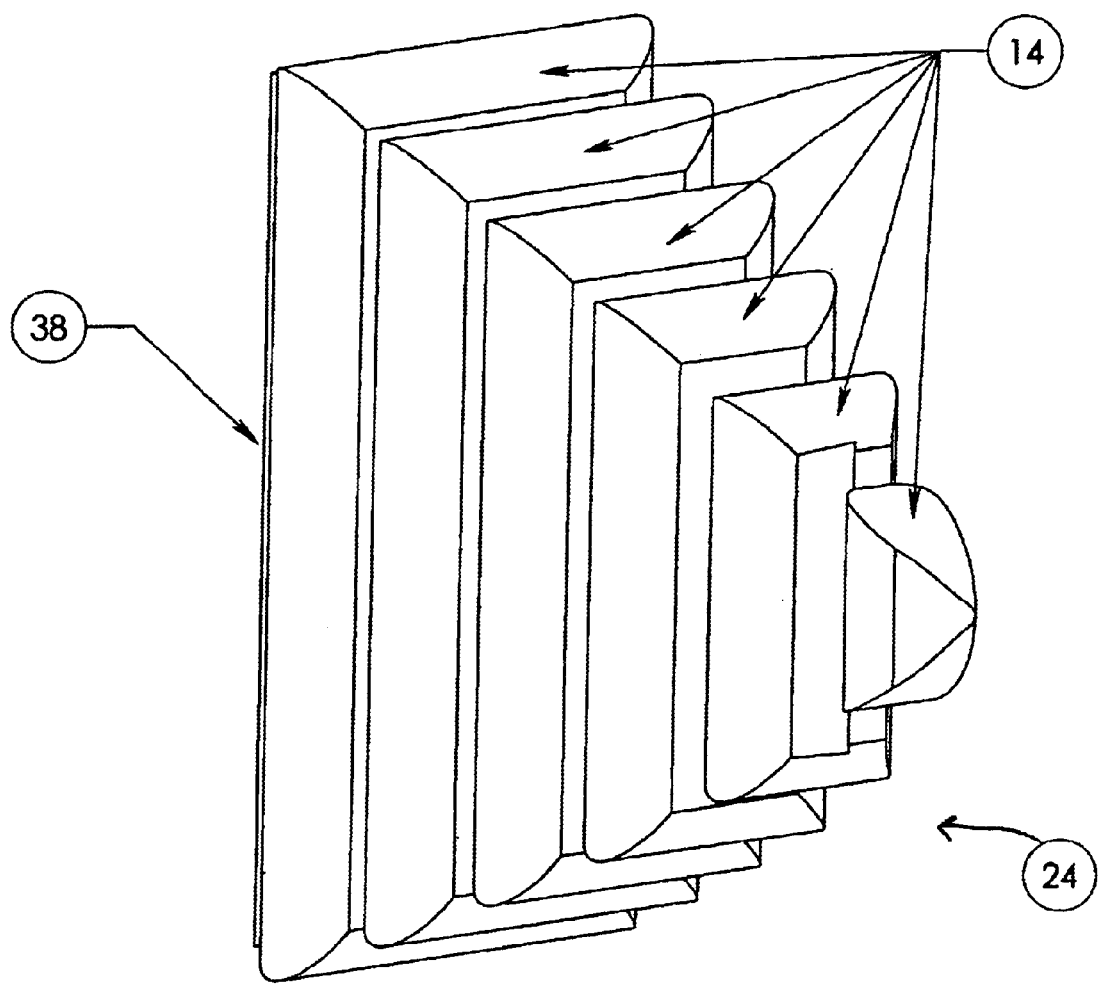
FIG. 5 is a side view of a male inner bladder, which is located inside the male outer shell.
Figure 6:
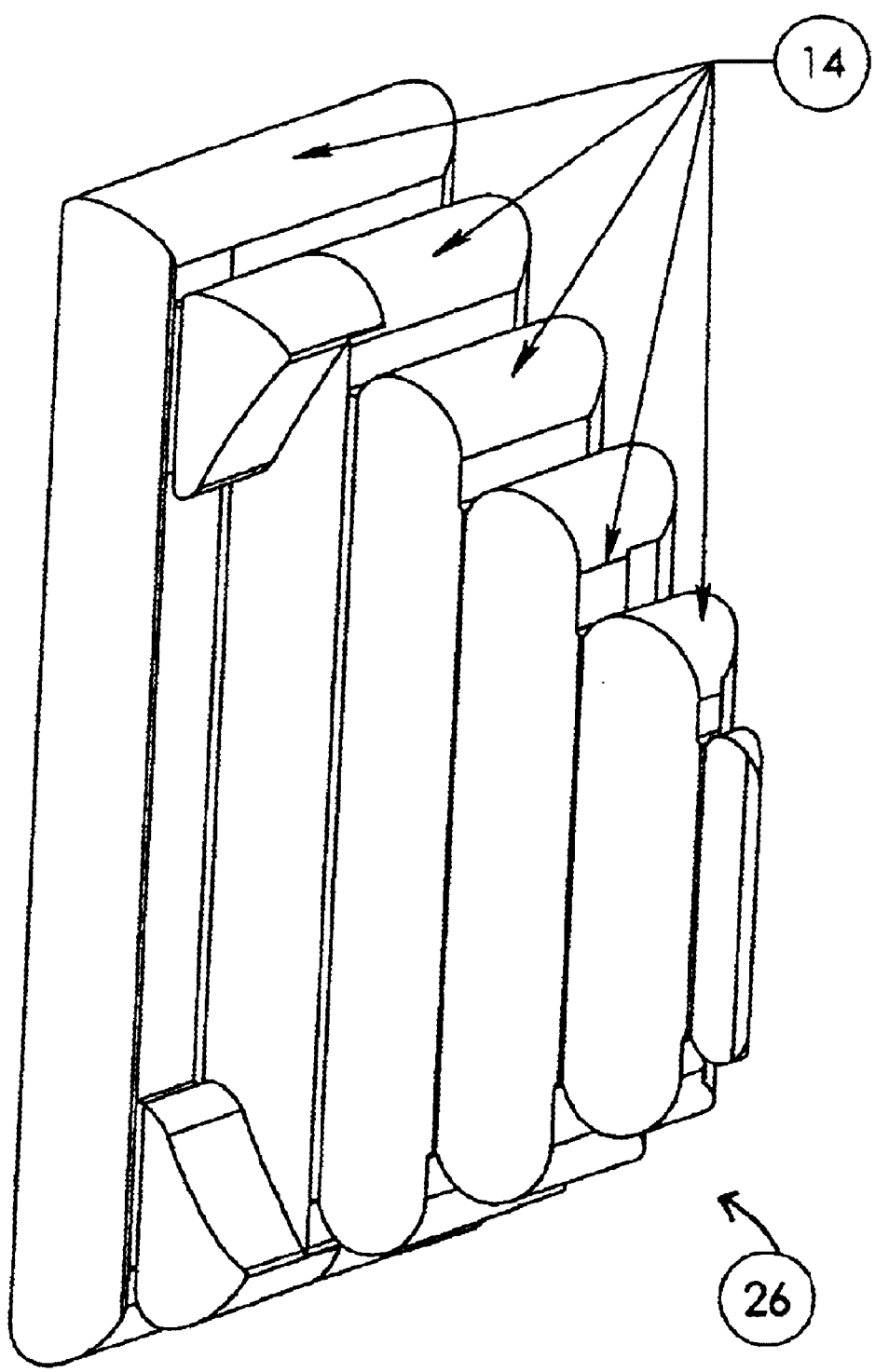
FIG. 6 is a side view of a female inner bladder, which is located inside the female outer shell.
Figure 7:
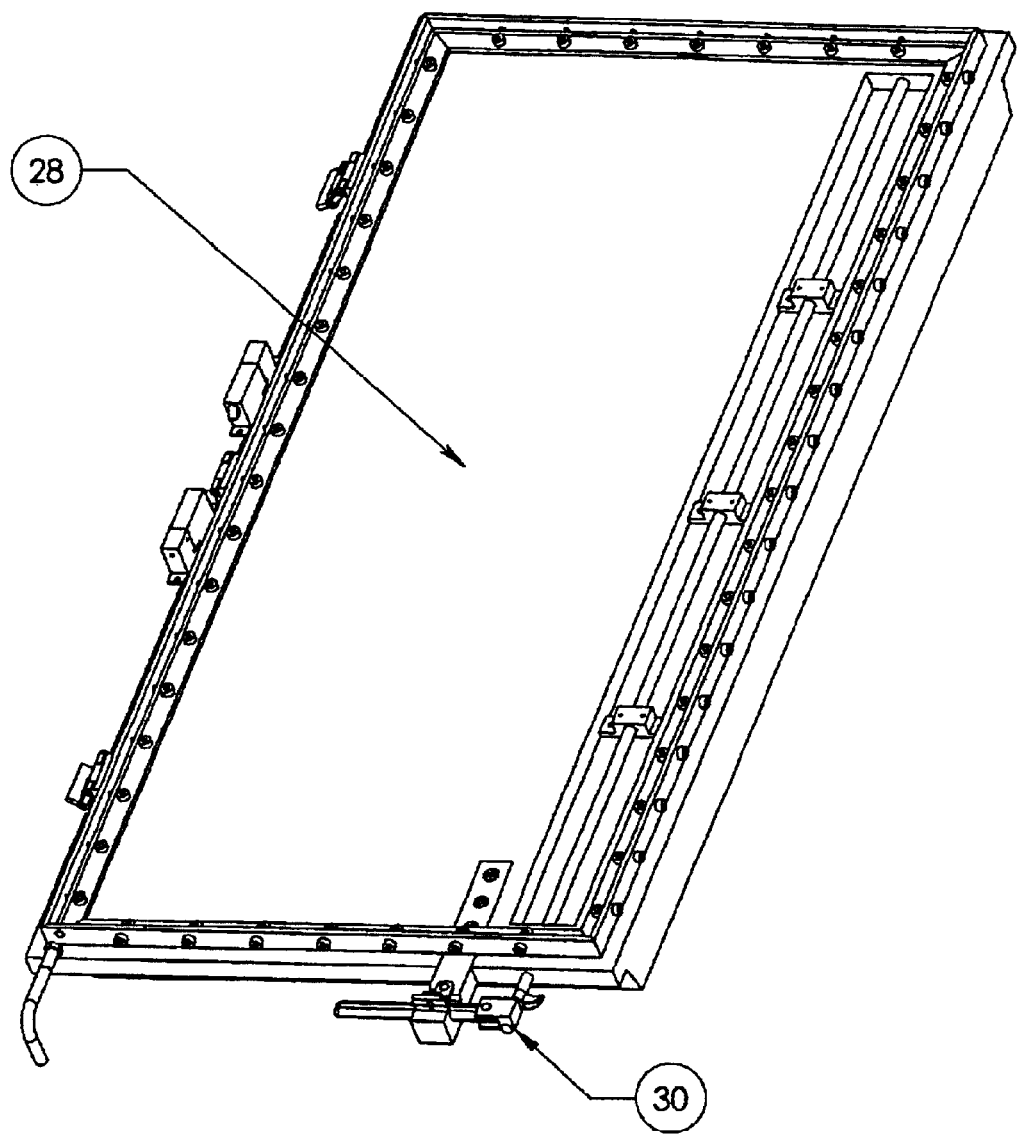
FIG. 7 is a view of a trailer door with a door latch mechanism.

Within the outer shells 20, 22, each half 74, 76 of the wind dam 1 contains inner bladders 24, 26 that are mounted to the trailer door 28 by grommets 38 placed along the mounting perimeter 78 of the inner bladders 24, 26 (seen generally in FIGS. 5–6). The bladders 24, 26 possess the same material qualities as the outer shells 20, 22; however, they may be less durable due to protection provided by the outer shells 20, 22. The fully inflated inner bladders 24, 26 will have the generic cone shape of the outer shells 20, 22, i.e., the male inner bladder 24 will have the shape of the outer shell 20, and the female inner bladder 26 will have the shape of the outer shell 22. The geometric difference between the female-inner bladder 26 and the male-inner bladder 24 is simply a result of the female inner bladder 26 having a female mating joint 12 formed by a groove and the male bladder 24 having the male mating joint 10 formed by a tongue.

The inner bladders 24, 26 are constructed with a series of quilted segments 14 stacked upon each other. This method of construction is to maintain the desired inflation cone-shape, without which the entire wind dam 1 would form more to the shape of a sphere. Hook and loop fastener is placed across the crown of each quilted segment 14 of the inner bladders 24, 26 corresponding to the location of hook and loop fastener applied to the inside of the outer shells 20, 22. By placing the hook and loop fastener in the positions described the inner bladders 24, 26 are able to retract the outer shells 20, 22 when deflation occurs. A connection (not shown) to the air supply (see FIG. 18) is made near the bottom outside corner of each of the inner inflatable bladders 24, 26 for inflation or deflation.

Mating Joint

Figure 1:
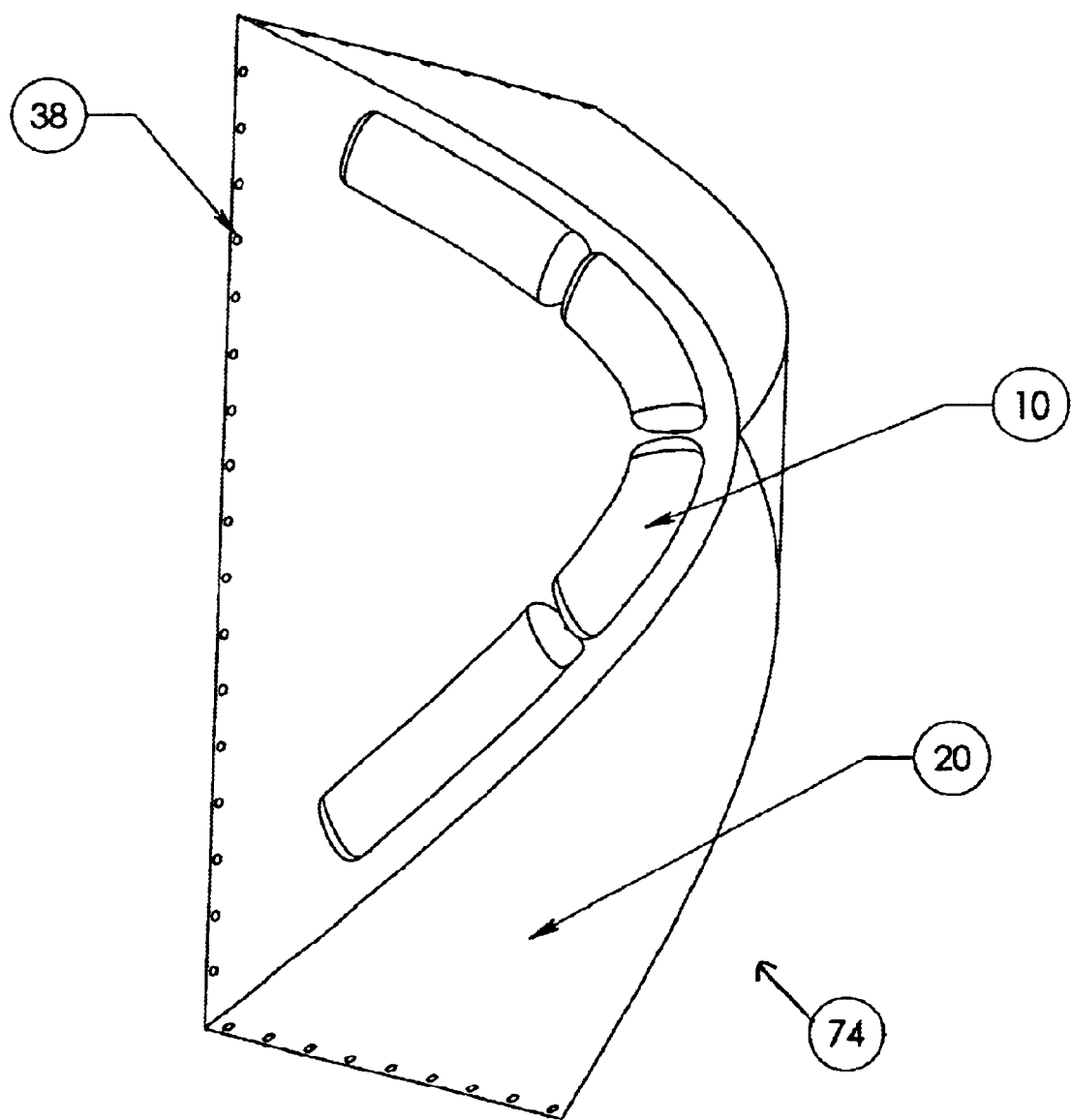
FIG. 1 is a perspective view of a male outer shell of a wind dam.

The tongue and groove mating joints 10, 12 are composed of two separate inflatable bladders, the female mating joint 12 formed as a groove and the male mating joint 10 formed as a tongue. The joints 10, 10 are constructed of material having the same qualities as the material used for the inner bladders 24, 26. The male mating joint 10 will be a tongue as seen in FIG. 1 along the outer shell 20 near the outer edge of the planar (adjoining) face and will extend along its perimeter. Possible shapes for the mating joints 10, 12 include a trapezoid, circle, or nearly any shape that has a locking cross-section between the male mating joint 10 and female mating joint 12. Regardless of the shape, the mating pairs 10, 12 will be slightly rounded when inflated.

The male mating joint 10 will be secured to the outer shell 20 by a zipper (not shown). Elastic material (not shown) may be attached to the exposed surfaces of the male mating joint 10 to slow its deployment during inflation and to confine its deflated size thereby preventing it from becoming trapped between the outer shells 20, 22 when the air dam 1 is inflated, thus allowing the male mating joint 10 to inflate within the corresponding female mating joint 12.

The female mating joint 12, formed as a groove, is secured to the female inner bladder 26. Attached by a zipper (not shown) to the outer shell 22, the female mating joint 12 is held in the correct position to accept the male mating joint 10, allowing the two halves 74, 76 to interact and form the fully inflated shape of the dam. Several webs (not shown) may be placed along the length of the female mating groove 12 to help prevent the conjoined joint from opening or separating as a result of a pulling force applied by the inflated male mating joint 10 when it is inside the female mating joint 12, therefore preventing the premature separation of the mating joints 10, 12.

Door Assembly

Figure 8:
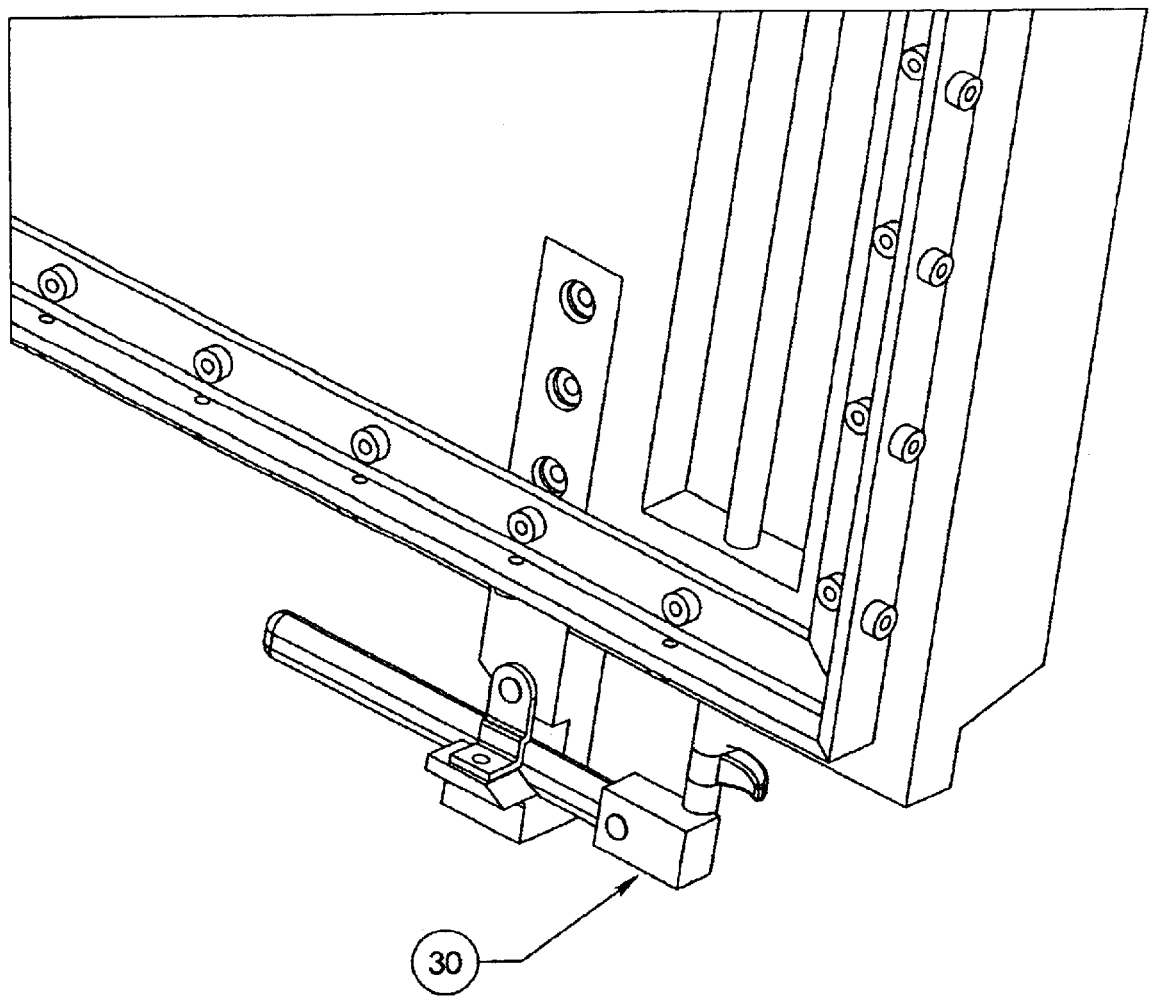
FIG. 8 is a close-up of the door latch mechanism.
Figure 9:
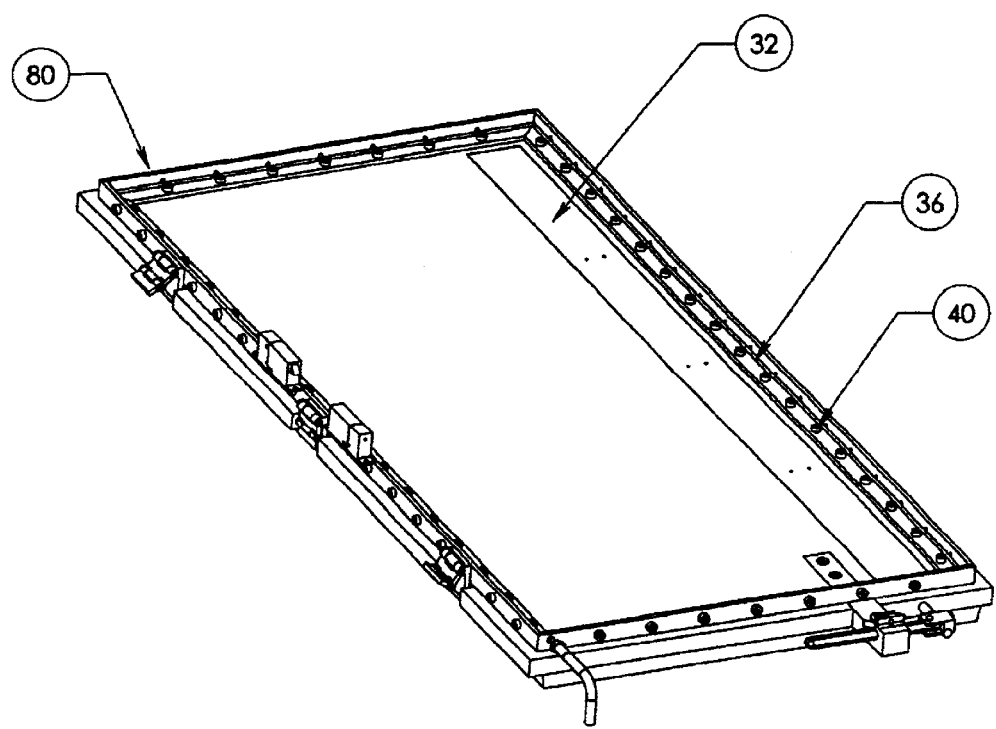
FIG. 9 is the trailer door with an L-shaped mounting bracket.
Figure 10:
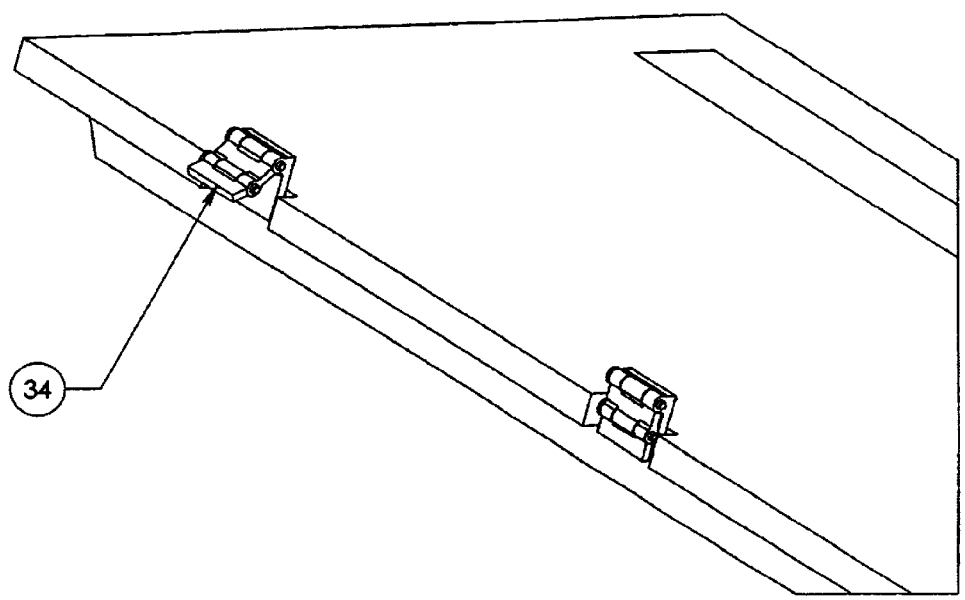
FIG. 10 shows a double hinge of the trailer door.

Due to expenses and problems concerning the attachment of the wind dam 1 to trailer doors 28, trailer doors 28 designed to accommodate the features required by the wind dam 1 may replace existing doors on the trailer. The geometry of the new trailer doors 28 will vary in overall height, width, and thickness. The new trailer doors 28 must seal the rear opening of the trailer in the same manner as the standard doors, and, the overall height and width of the trailer doors 28 must combine to match the exterior dimensions of the trailer. Furthermore, the overall thickness of the trailer doors 28 will be increased to house the wind dam 1 while providing the same value of insulation and security as before. The trailer doors 28 will use the standard door operating mechanism 30 (see FIG. 8), with modifications including a cover plate 32 (see. FIG. 9) for mounting within the trailer door 28, which allows for locating the door operating mechanism 30 behind the wind dam 1 from the perspective of the back of the trailer, rather than on the front. Door hinges 34 will consist of double hinges to allow the thicker trailer doors 28 to rotate parallel to the sides of the trailer when fully opened (seen generally in FIG. 10).

Figure 11:
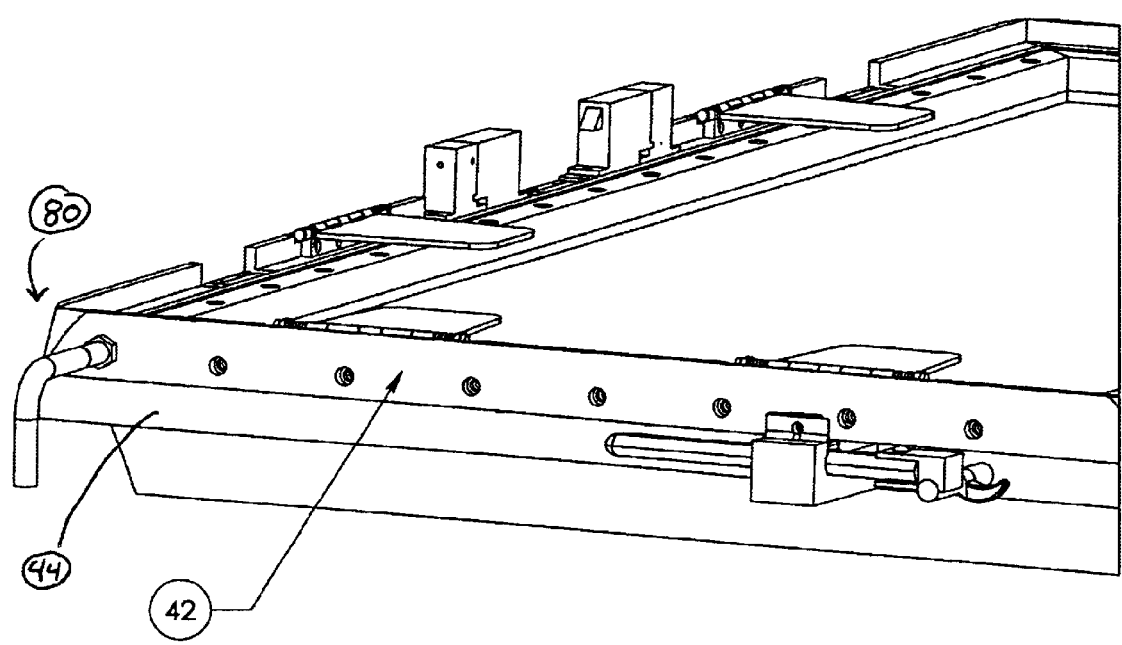
FIG. 11 is a view of a flat mounting bracket for the outer shell of the trailer door.
Figure 12:
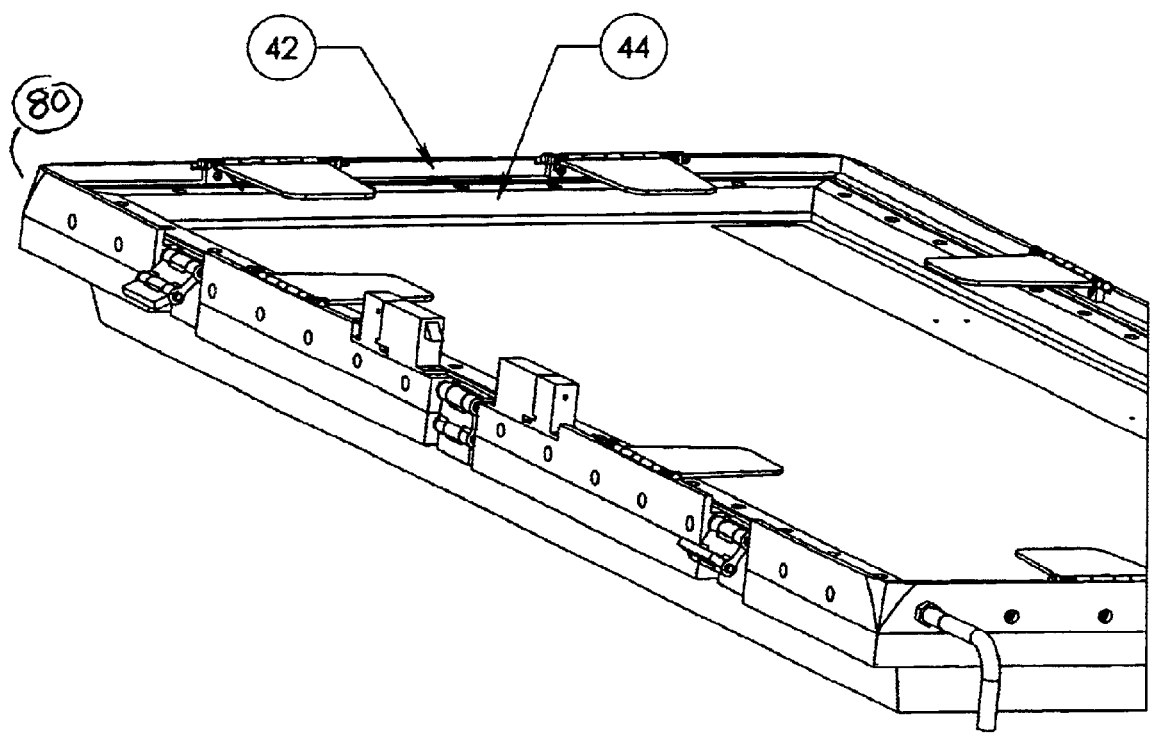
FIG. 12 is a view of a flat mounting bracket for the inner bladder of the trailer door.

As shown generally in FIGS. 9, 11, and 12, a mounting bracket assembly 80 will be securely attached to the rectangular perimeter of each trailer door 28 for securing the outer shells 20, 22 to each trailer door 28. The mounting bracket assembly 80 consists of three relatively light, rigid brackets 36, 42, and 44 on the trailer door 28 perimeter. The first bracket 36, which is L-shaped, is bolted to the trailer door 28 and has raised cylindrical protrusions 40 along the bracket 36 surfaces that correspond in position to accept the grommets 38 on the outer shell 20, 22 and inner bladder 24, 26 to ensure correct alignment (see FIG. 9). The remaining two brackets 42, 44, which are flat, are bolted to their respective mating surface adjacent to the first bracket 36 and hold the perimeters of the outer shells 20, 22 and their respective inner bladders 24, 26 in place, i.e., the flat bracket 42 is used to hold the outer shells 20, 22 in place (see FIG. 11) and the flat bracket 44 is used to hold the inner bladders 24, 26 in place (see FIG. 12).

To securely mount the wind dam 1 to the trailer doors 28, grommets 38 are used along the mounting perimeter 78 of the outer shells 20, 22 to ensure proper alignment on the mounting bracket 36. Grommets 38 may also be placed along the mounting perimeter 78 of the inner bladder 24 and 26 and used in the same manner as the outer shells 20, 22. The grommets 38 along with the hook and loop fastener 60 placed between the trailer door 28 and the inner bladders 24, 26, and between the inner bladders 24, 26 and the outer shells 20, 22, all function together to securely mount the wind dam 1 on the trailer door 28.

Figure 13:
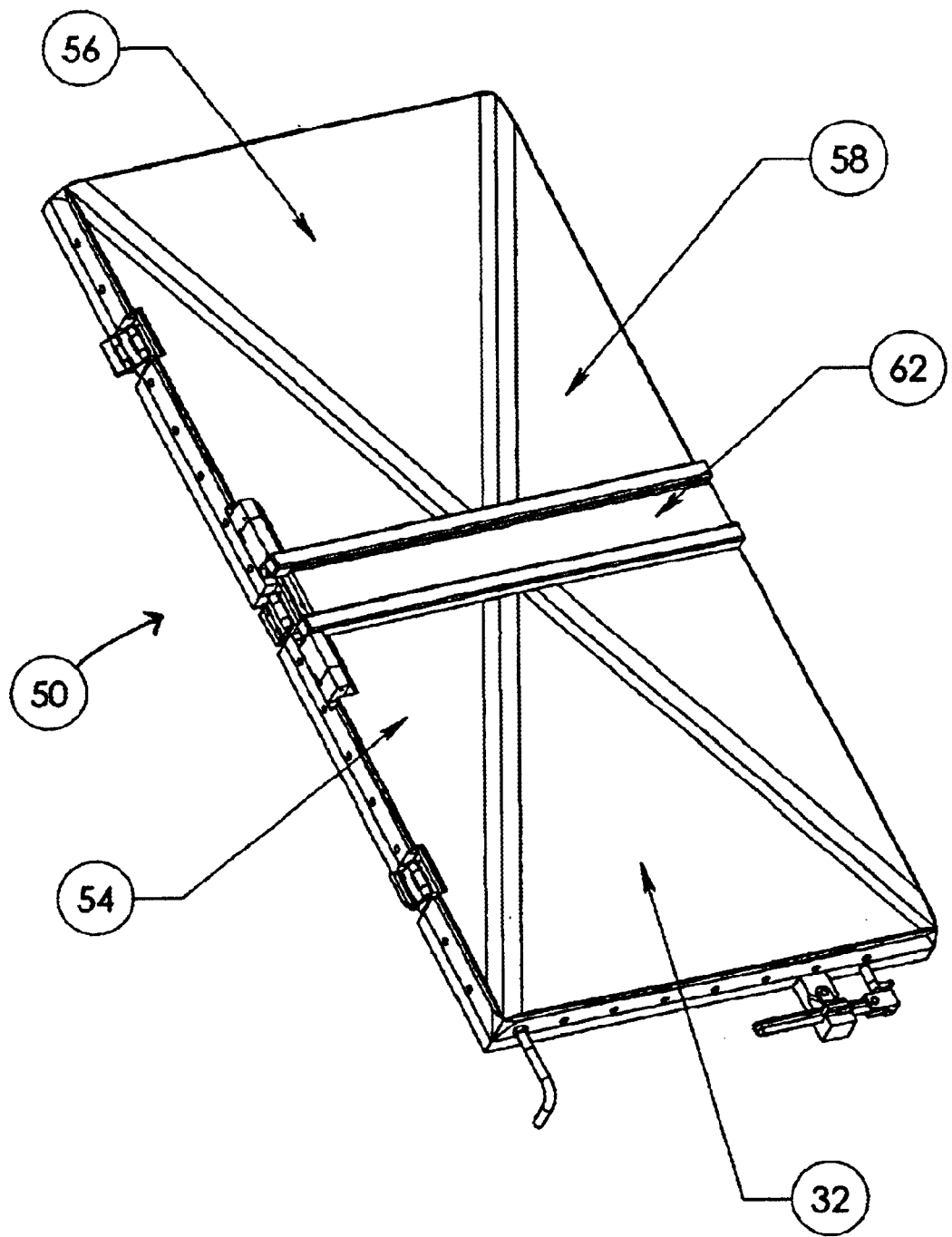
FIG. 13 is a view of the trailer door with a closed flap structure.
Figure 14:
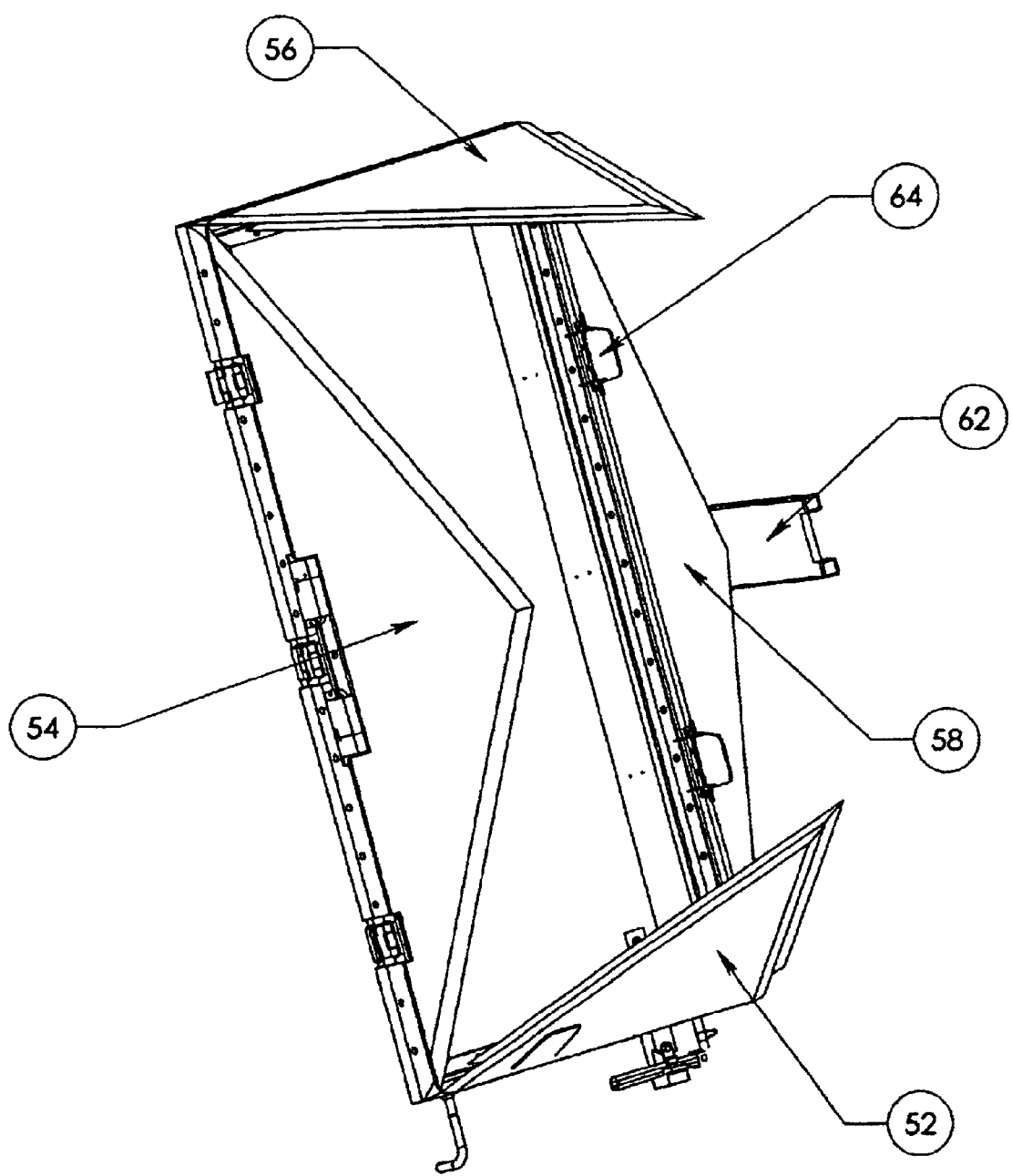
FIG. 14 is a view of the trailer door with an open flap structure.
Figure 15:
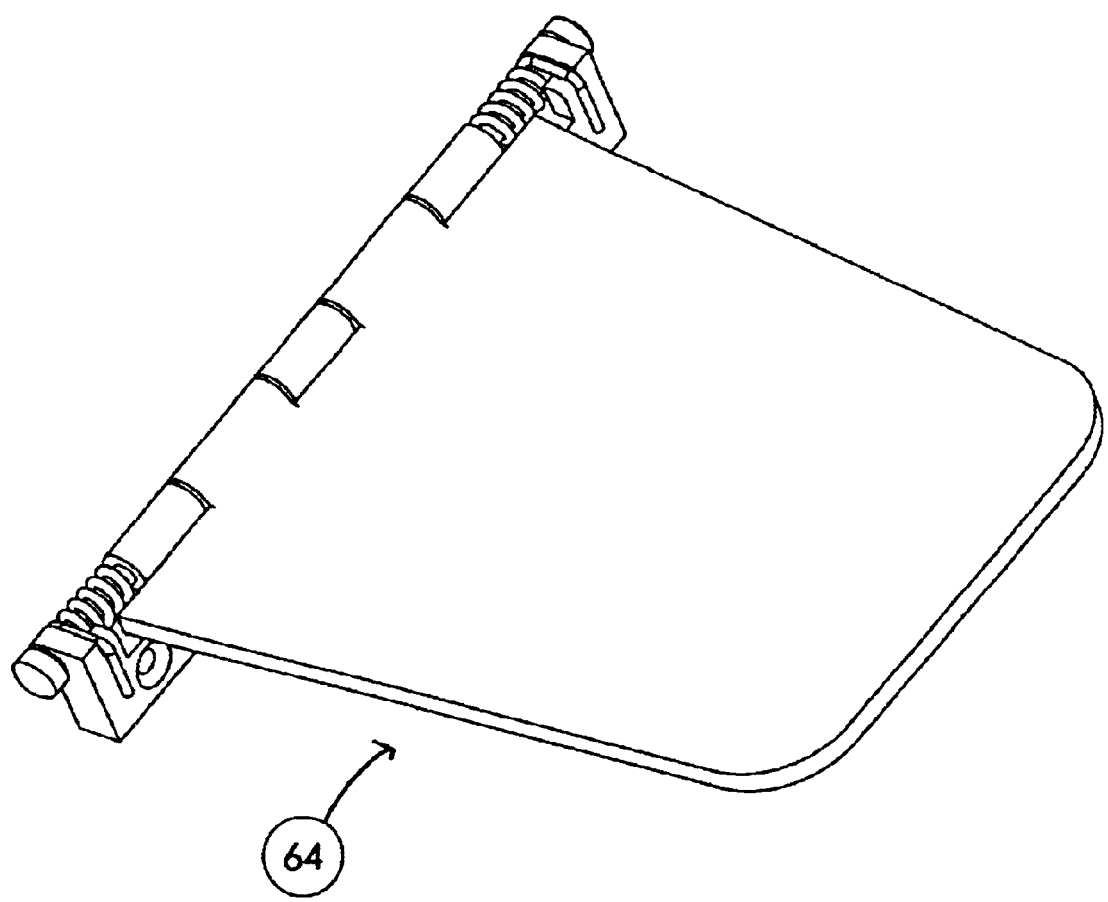
FIG. 15 is a view of a flap hinge on the trailer door.
Figure 16:
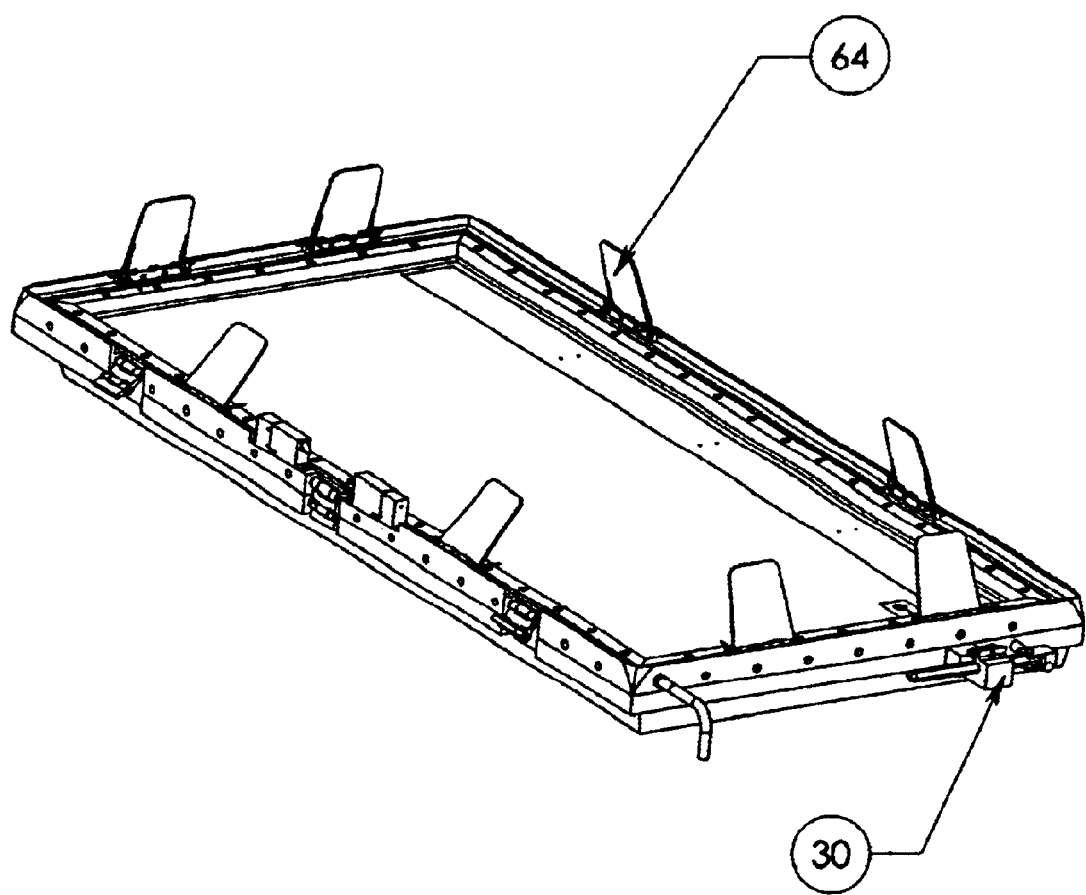
FIG. 16 is a view of the trailer door with mounted flap hinges.

A flap structure 50 is used to provide protective storage for each half 74, 76 of the wind dam 1 when in the deflated state (FIG. 13). The flap structure 50 consists of four, triangular-shaped flaps 52–58, each of which are hinged to the mounting bracket 36 and attached to the outer shells 20, 22. The flaps 52–58 must be durable, lightweight, and semi-rigid so that the flaps are able to conform to the shape of the wind dam 1 when the wind dam 1 is inflated so as to not inhibit the drag reduction, and return to its planar or non-curved shape when the wind dam 1 is deflated. A crossover bar 62 is attached to the inner-side flap 58 for locking the flaps 52–58 in place when the wind dam 1 is deflated. The flaps 52–58 are attached by a spring-loaded hinge 64 or spring/hinge combination (FIG. 15) that governs the flap 52–58 rotation in order to close the flaps 52–58 in sequence, such as bottom 52, top 56, outer-side 54, and inner side 58 last. In this regard, the bottom and top flaps 52, 56 include a lip that extends along the diagonal perimeter of the flaps 52, 56, such that the side flaps 54, 58 cover the lip when the side flaps 54, 58 are in a closed position. Thus, the side flaps 54, 58 hold the bottom and top flaps 52, 56 closed when the air damn 1 is deflated. This type of closure aids weather tight construction and is further enhanced by placing weather stripping material (not shown) along the seams of the flaps 52–58. The flaps 52–58 are required to remain open and resist closure until sequentially closed to prevent portions of the deflated dam from sagging through the mating seams of the flaps 52–58 when closed and to ensure the flaps 52–58 enclose the entire dam upon full deflation. For the proper closure sequencing, the spring sizes and numbers will vary for the different hinge flaps 64.

Figure 17A:
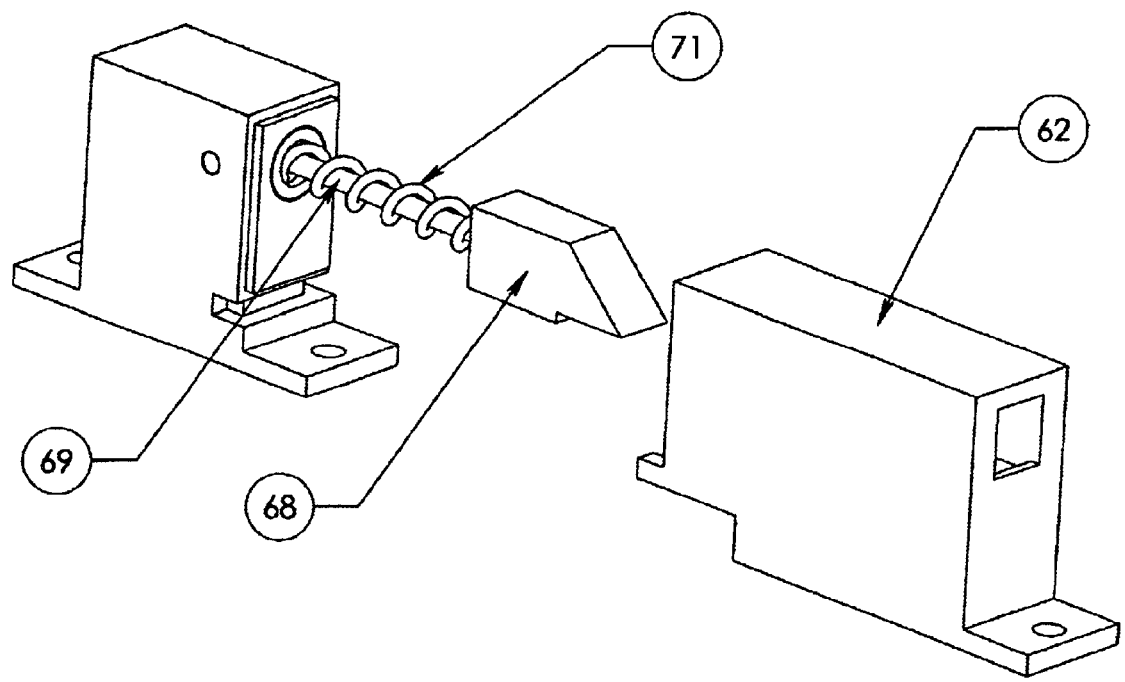
FIG. 17a is a view of a pneumatic latch assembly on the trailer door.
Figure 17B:
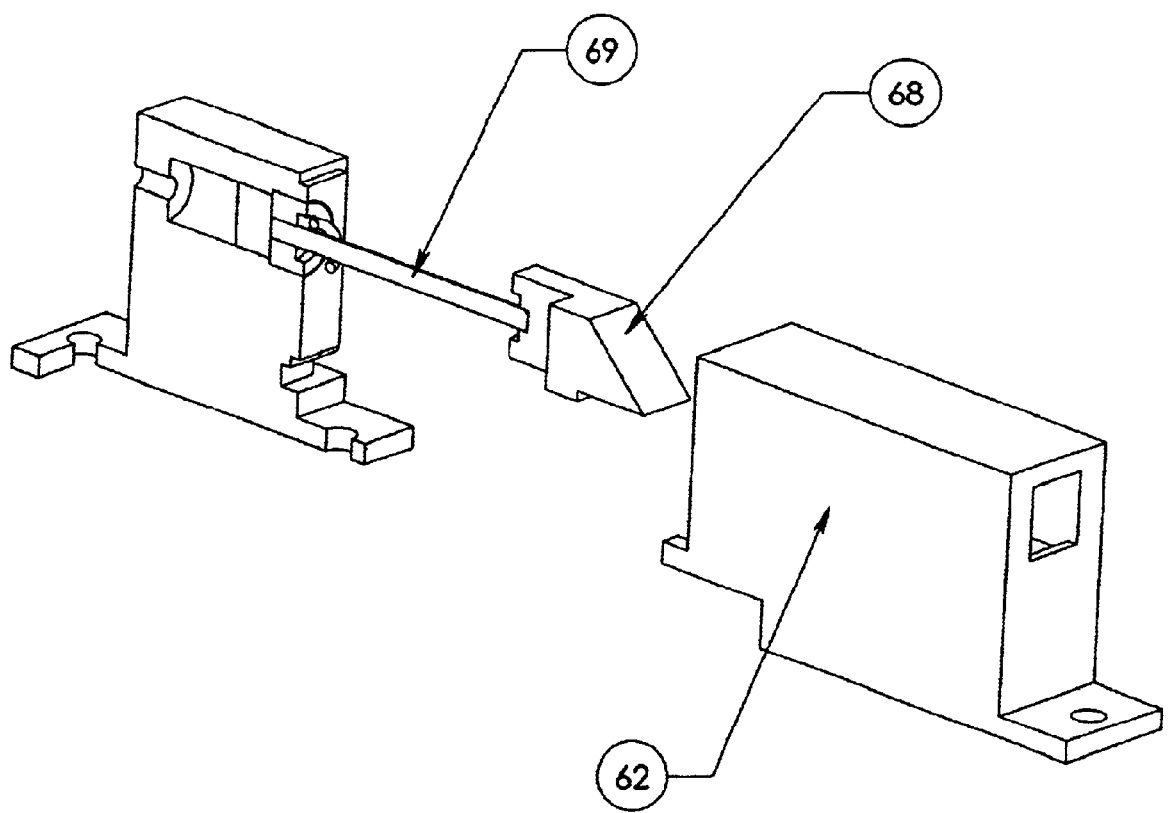
FIG. 17b is a cut-away view of the pneumatic latch assembly on the trailer door.

Shown in FIGS. 17a and 17b is a pneumatic latch system 66, used to lock the flap structure 50 when the wind dam 1 is in the deflated state. The latch system 66 is attached to the outer perimeter of the mounting bracket assembly 80 and connected to the air supply system for operation. The system 66 uses a simple air cylinder to lock and unlock the crossover bar 62. When air is applied to the system 66 the air cylinder 69 retracts a wedge shaped lock 68 and the crossover bar 62 is released. Conversely, when the wind dam 1 is deflated the vacuum and spring 71 cause the air cylinder to move the wedge shaped lock 68 in the opposite direction for locking the crossover bar 62. An electrical latch system may be used in place of the pneumatic latch system 66 but the same concept still applies.

Operation

Figure 18:
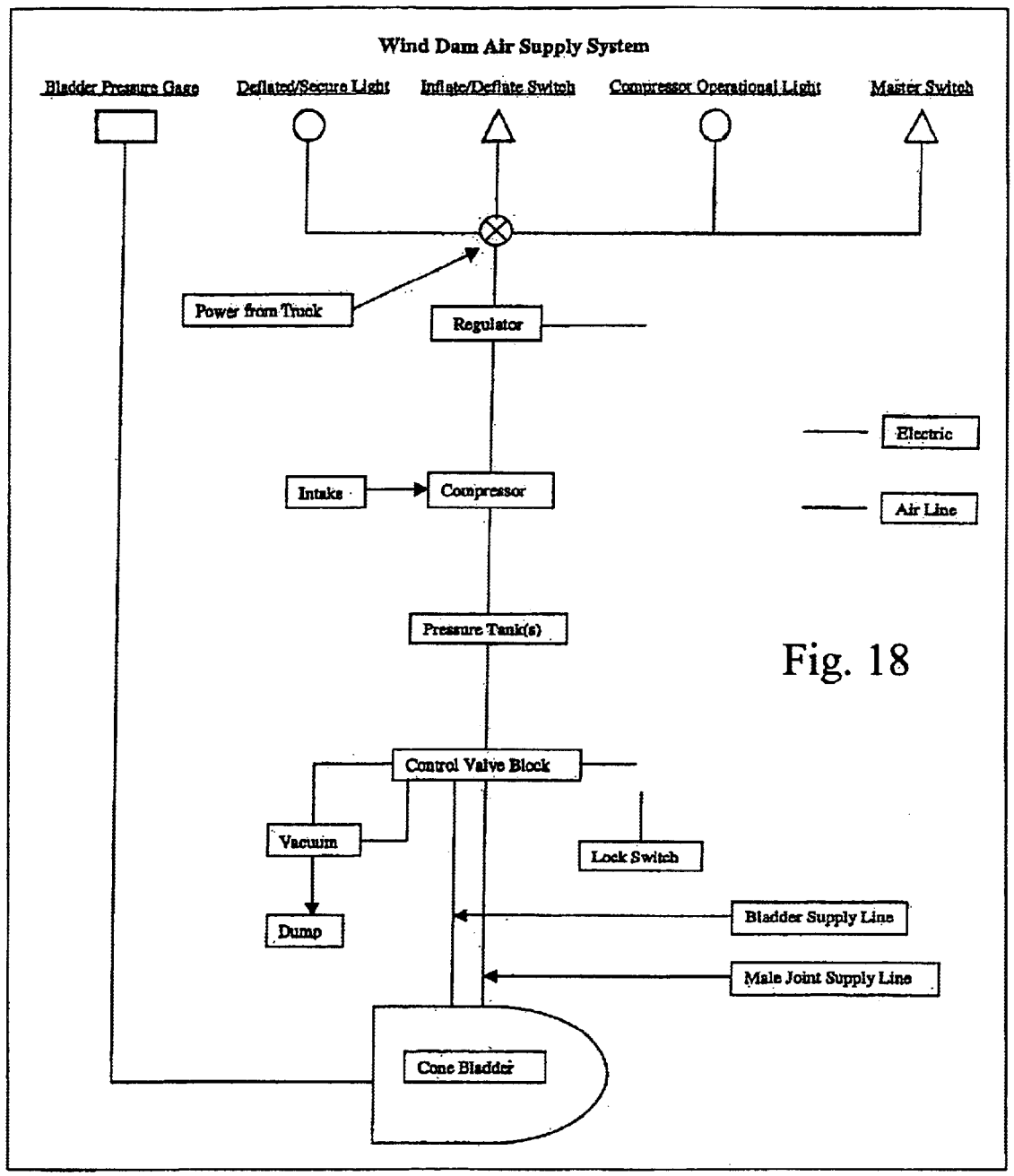
FIG. 18 is a schematic diagram of a wind dam air supply system for inflation of the wind dam.
Figure 19:
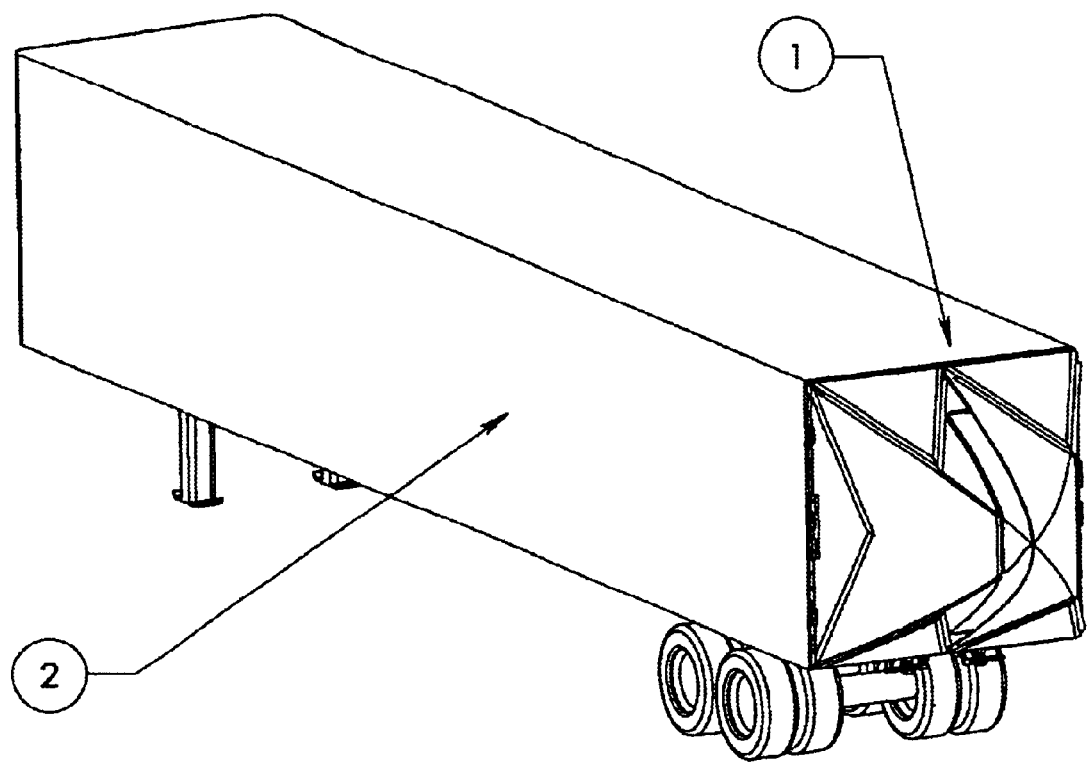
FIG. 19 is a perspective view of the wind dam secured to a trailer, in an inflated position.
Figure 20:
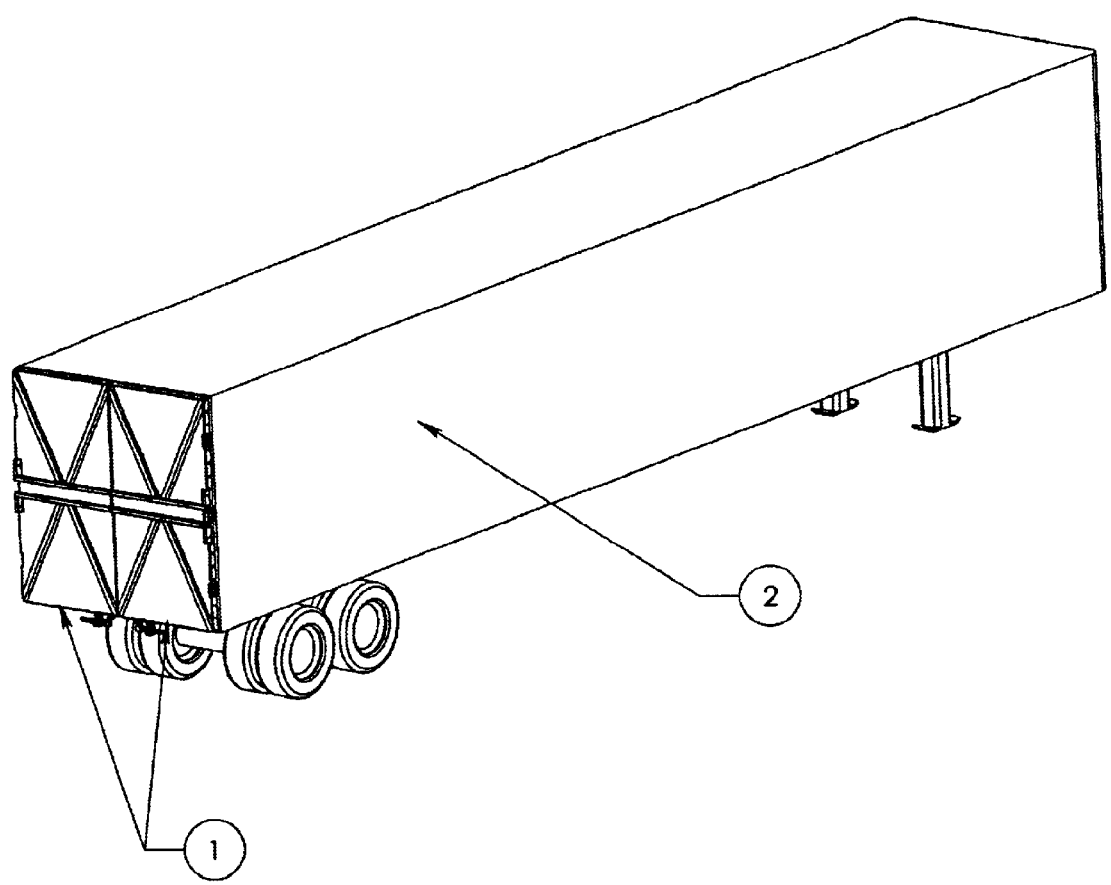
FIG. 20 is a perspective view of the wind dam secured to the trailer, in a deflated storage position.

FIG. 18 diagrams schematically the wind dam air supply system (see FIG. 18). The air supply system consists of a bladder pressure gage, a deflated indicator light, an inflate/deflate switch, a compressor operational light, and a master switch, located within the tractor cab (not shown). The following operational chart shows the position of each control valve under various conditions.

| Wind Dam Operational Chart | | | | | |
|---|---|---|---|---|---|
| Truck Condition | Inflation Switch | Bladder Condition | Supply Valve | Delay Valve | Dump Valve |
| Stopped | Deflate | Normal | Closed | Open | Open |
| Stopped | Inflate | Normal | Open | Closed/Open | Closed |
| Moving | Inflate | Normal | Open | Closed/Open | Closed |
| Moving | Deflate | Normal | Closed | Open | Open |
| Stopped | Inflate | Rupture | Open | Closed/Open | Closed |
| Moving | Inflate | Rupture | Open | Closed/Open | Closed |

The truck condition does not affect the valve positions, but is included for conceptual analysis. When the inflation switch is turned on, the supply valve opens, the delay valve opens when reaching a given pressure, and the dump valve closes. Conversely, when the deflation switch is turned on, the supply valve closes, the delay valve opens, the dump valve opens, and the vacuum engages until the latch system 66 is triggered by the crossover bar 62. This way the operator may inflate or deflate the wind dam 1 from inside the cab, provided normal conditions exist. In the event of a rupture to the system, an indication light within the cab provides the operator with information regarding the operation of the compressor and inflation/deflation of the bladders 24, 26, from which the system may be shut down.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

I claim:

1. An inflatable wind dam device mounted to a leeward end of a tractor-trailer for reducing the air drag of a moving tractor-trailer, comprising:

a first longitudinally opposed section of the wind dam leewardly attached to the tractor-trailer, the first opposed section having an outer shell, and the outer shell containing an inner inflatable bladder, a second longitudinally opposed section of the wind dam leewardly attached to the tractor-trailer, the second opposed section having an outer shell, and the outer shell containing an inner inflatable bladder, and a mating joint located on said first and second opposing sections for operationally connecting said opposed sections upon inflation of said sections, wherein said mating joint comprises an inflatable tongue and groove joint.

2. The invention in accordance with claim 1 wherein said opposing sections form a cone when operationally connected.

3. The invention in accordance with claim 2 wherein said inner inflatable bladders are comprises of a plurality of quilted segments that substantially conform to the form of said cone.

4. The invention in accordance with claim 1 wherein the inner inflatable bladders are connected to said outer shells with hook and loop fastener.

5. The invention in accordance with claim 1 wherein said inner inflatable bladders are connected to the tractor-trailer with grommets.

6. The invention in accordance with claim 5 wherein further comprising brackets located along the perimeter of the tractor-trailer for receiving said grommets.

7. The invention in accordance with claim 1 wherein said outer shells are connected to the tractor-trailer with grommets.

8. The invention in accordance with claim 7 wherein further comprising brackets located along the perimeter of the tractor-trailer for receiving said grommets.

9. The invention in accordance with claim 1 further comprising a flap assembly secured to the tractor-trailer for containing said opposed sections when not in operation.

10. The invention in accordance with claim 9 wherein said flap assembly comprises a four panel spring self closing assembly.

11. The invention in accordance with claim 9 wherein said flap assembly comprises a locking crossover bar to retain the flap assembly in closed position.

12. The invention in accordance with claim 9 wherein said flap assembly is pneumatically activated.

* * * * *